Figure 1:
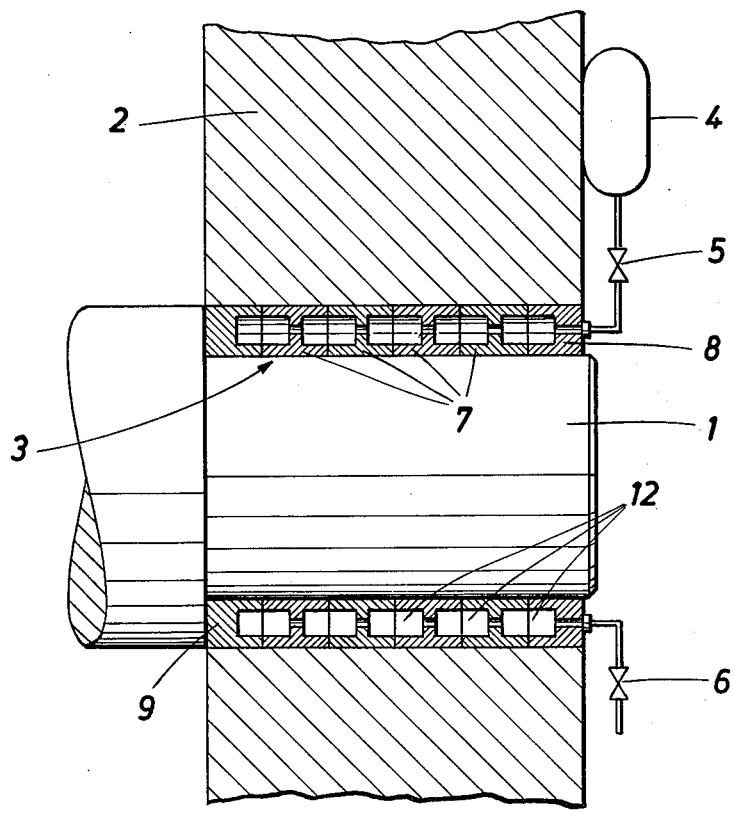

United States Patent [19]

Schwenzfeier et al.

[11] 4,428,737
[45] Jan. 31, 1984

[54] FRICTION COUPLING AND COUPLING SLEEVE

[75] Inventors: Werner Schwenzfeier; Franz Kawa, both of Leoben, Austria

[73] Assignee: Voest-Alpine Aktiengesellschaft, Linz, Austria

[21] Appl. No.: 294,705

[22] Filed: Aug. 20, 1981

[30] Foreign Application Priority Data

Sep. 10, 1980 [AT] Austria .................. 4540/80

[51] Int. Cl.³ .................. F16D 7/02; F16D 25/04
[52] U.S. Cl. .................. 464/28; 192/85 AT; 192/88 B; 403/5
[58] Field of Search .................. 464/24, 28; 403/5; 192/76, 85 AT, 88 B; 242/72 B

[56] References Cited

U.S. PATENT DOCUMENTS

| 2,193,481 | 3/1940 | Fawick | 192/88 B |
| 3,473,640 | 10/1969 | Schutz | 464/28 X |
| 3,834,257 | 9/1974 | Ganser | 242/72 B X |
| 4,341,484 | 7/1982 | Peterson et al. | 464/28 X |

FOREIGN PATENT DOCUMENTS

| 812861 | 9/1951 | Fed. Rep. of Germany . | |
| 917464 | 9/1954 | Fed. Rep. of Germany . | |
| 1033466 | 7/1958 | Fed. Rep. of Germany . | |
| 1286824 | 1/1969 | Fed. Rep. of Germany | 464/28 |
| 2225198 | 1/1973 | Fed. Rep. of Germany . | |
| 2659547 | 7/1978 | Fed. Rep. of Germany | 403/5 |
| 696197 | 11/1979 | U.S.S.R. | 403/5 |
| 703697 | 12/1979 | U.S.S.R. | 464/28 |

Primary Examiner—John Petrakes
Assistant Examiner—Daniel P. Stodola
Attorney, Agent, or Firm—Kurt Kelman

[57] ABSTRACT

In a friction coupling comprising a shaft, a hub surrounding the shaft, a coupling sleeve disposed between the shaft and the hub, the coupling sleeve having an elastic hollow wall defining an internal cavity and comprising radially inner and outer peripheral wall portions respecitvely facing the shaft and the hub, and fluid under pressure in the cavity to force the peripheral wall portions against the shaft and the hub under a pressure sufficient for transmitting a torque between the shaft and the hub by the coupling sleeve, torque transmission is assured with a coupling sleeve consisting of a flexible tube composed of an assembly of a plurality of joined I-section strips, each strip having two transverse web portions and an interconnecting vertical web portion, the transverse web portions being joined to form the peripheral wall portions of the coupling sleeve and the vertical wall portions constituting load-carrying partitions in the internal cavity for transmitting peripheral forces between the shaft and the hub, the partitions separating the internal cavity into separate annular chambers and defining passages therein to connect the annular chambers, and two profiled end sections joined to the assembly at respective ends thereof.

3 Claims, 3 Drawing Figures

FRICTION COUPLING AND COUPLING SLEEVE

This invention relates to a friction coupling comprising a coupling sleeve, which is disposed between a shaft and a hub and consists of a flexible tube that is adapted to be supplied with a fluid under pressure.

In the known couplings of this kind the endless flexible tube which is disposed between a shaft and a hub is forced against the shaft and the hub by the pressure applied to the tube so that the torque that can be transmitted by the tube will depend in case of a constant coefficient of friction on the fluid pressure applied to the tube and can be adjusted by a change of the fluid pressure applied. Such friction couplings have the disadvantage that the torque must be transmitted by the wall of the tube, specifically by the axially outer end wall portions of the coupling sleeve which connect the radially inner and outer peripheral wall portions of the coupling sleeve and extend substantially radially with respect to the shaft. This fact imposes an upper limit on the torque which can be transmitted and involves a variation of the pressure applied by the tube to the shaft and the hub over the contacting surfaces because the end wall portions of the coupling sleeve prevent a deformation of the adjacent tube wall portions which extend in the peripheral direction of the shaft so that the tube will apply a lower pressure to the shaft and hub near the end wall portions of the coupling sleeve.

It is an object of the invention to avoid these disadvantages and so to improve a friction coupling of the kind described first hereinbefore that it can be used to transmit a relatively high torque.

This object is accomplished in accordance with the invention with a coupling sleeve consisting of a flexible tube composed of an assembly of a plurality of joined I-section strips, each strip having two transverse web portions and an interconnecting vertical web portion, the transverse web portions being joined to form the peripheral wall portions of the coupling sleeve and the vertical wall portions constituting load-carrying partitions in the internal cavity for transmitting peripheral forces between the shaft and the hub, the partitions separating the internal cavity into separate annular chambers and defining passages therein to connect the annular chambers, and two profiled end sections joined to the assembly at respective ends thereof. With such a coupling sleeve, which extend preferably in the peripheral direction, or the coupling sleeve comprises a plurality of convolutions of the flexible tube.

Owing to the provision of partitions, the torque is transmitted not only by the radially extending end wall portions of the coupling sleeve but also by the partitions so that the several walls or wall portions are subjected to smaller fractions of the load and a higher torque can be transmitted. The partitions which join the peripheral tube wall portions also prevent a pronounced bulging of the tube in the middle of its width. As a result, the tube will be deformed more uniformly and the pressure applied by the tube to the shaft and the hub will be more uniform throughout the contacting surfaces. This more uniform application of pressure substantially eliminates the influence of the deformation of the tube so that the desired limiting torque will depend only on the pressure applied to the tube if the coefficient of friction is reasonably constant.

To ensure that in an arrangement having continuous partitions it is not necessary to supply pressure fluid to separate chambers between the partitions, the latter may be formed with passages for the pressure fluid. But such passages will reduce the load-carrying cross-sectional area and this will be particularly significant if all passages are coaxial. For this reason the passages in the several partitions are preferably laterally offset from each other so that the passages are distributed over the cross-sectional area of the coupling sleeve.

If the partitions extend at an oblique angle to an associated radius of the shaft in a plane which contains the axis of the shaft, it will not be necessary to stretch the partitions during an inflation of the tube in response to the supply of pressure fluid. For this reason, relatively large radial displacements can be effected in response to a given fluid pressure applied.

The invention is illustrated by way of example on the drawing, in which

Figure 2:
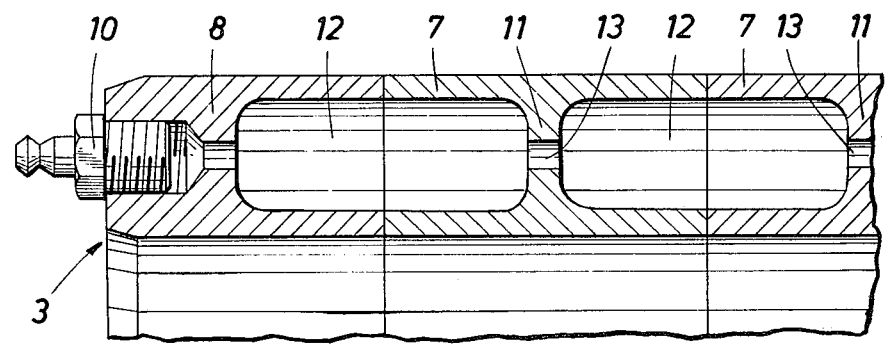
Figure 3:
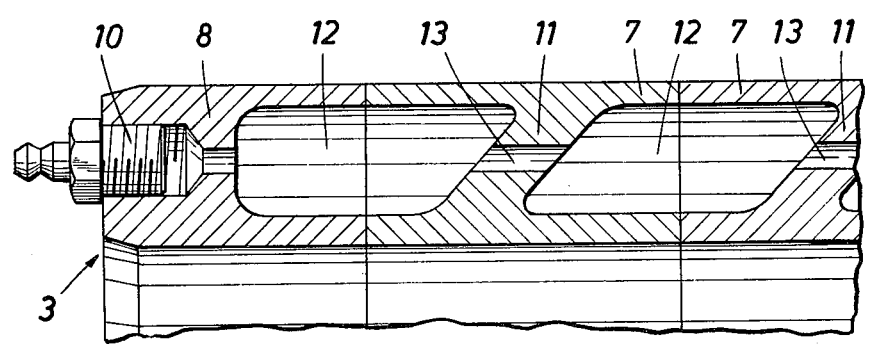

FIG. 1 is an axial sectional view showing diagrammatically a friction coupling according to the invention and FIGS. 2 and 3 are axial sectional views showing different embodiments of a coupling sleeve.

The friction coupling shown in FIG. 1 comprises a shaft 1, a hub 2 and a coupling sleeve 3, which is disposed between the shaft 1 and the hub 2 and can be supplied with pressure fluid from a source through a valve 5 in order to establish a frictional connection between the shaft 1 and the coupling sleeve 3 and between the latter and the hub 2. The friction coupling can be disengaged by opening outlet valve 6 to relieve the coupling sleeve 3 from pressure.

The coupling sleeve 3 consists of a flexible tube, composed of a plurality of joined I-section strips 7. The latter are joined preferably by electron beam welding. Two profiled end sections 8 and 9 are welded to the ends of the assembly formed by the interconnected profiled strips 7 and may serve as backing rings preventing an axial expansion of the coupling sleeve 3. The tube is connected to pressure fluid conduits by nipples 10 provided in the end sections 8.

The webs of the I-section strips 7 constitute partitions 11, interconnecting the peripheral wall portions of the coupling sleeve 3 so that part of the peripheral forces exerted between the shaft 1 and the hub 2 will be transmitted from the hub to the shaft or from the shaft to the hub by said partitions. As a result, the friction coupling can transmit a high torque. These load-carrying partitions 11 define separate annular chambers 12, which would have to be separately supplied with fluid under pressure without the passages 13 connecting them. In order to avoid as far as possible a weakening of the coupling sleeve adjacent to the passages 13, the latter are laterally offset from each other, different from the showing on the drawing.

In the embodiment shown in FIG. 3 the partitions 11 of the coupling 3 extend at an oblique angle to associated radii of the shaft 1 so that a radial expansion of the coupling sleeve will be facilitated as the partitions 11 need not be stretched.

What is claimed is:

1. In a friction coupling comprising a shaft, a hub surrounding the shaft, a coupling sleeve disposed between the shaft and the hub, the coupling sleeve having an elastic hollow wall defining an internal cavity and comprising radially inner and outer peripheral wall portions respectively facing the shaft and the hub, and means for supplying fluid under pressure into the cavity to force the peripheral wall portions against the shaft and the hub under a pressure sufficient for transmitting a torque between the shaft and the hub by the coupling sleeve:

the coupling sleeve consisting of a flexible tube composed of an assembly of a plurality of joined I-section strips, each strip having two transverse web portions and an interconnecting vertical web portion, the transverse web portions of adjacent strips being joined to form the peripheral wall portions of the coupling sleeve and the vertical wall portions constituting load-carrying partitions in the internal cavity for transmitting peripheral forces between the shaft and the hub, the partitions separating the internal cavity into separate annular chamber and defining passages therein to connect the annular chambers, and two profiled end sections joined to the assembly at respective ends thereof.

2. The coupling sleeve in the friction coupling of claim 1, wherein the load-carrying partitions include an oblique angle with an associated radius of the shaft in a plane containing the axis of the shaft.

3. The coupling sleeve in the friction coupling of claim 1, wherein the passages in the partitions are laterally offset from each other.

* * * * *